United States Patent
Ouammi et al.

(10) Patent No.: US 12,137,648 B2
(45) Date of Patent: Nov. 12, 2024

(54) SELF-COOLING GREENHOUSE FOR HOT CLIMATE

(71) Applicant: QATAR UNIVERSITY, Doha (QA)

(72) Inventors: Ahmed Ouammi, Doha (QA); Driss Zejli, Rabat (MA); Sami Sayadi, Doha (QA)

(73) Assignee: QATAR UNIVERSITY, Doha (QA)

( * ) Notice: Subject to any disclaimer, the term of this patent is extended or adjusted under 35 U.S.C. 154(b) by 444 days.

(21) Appl. No.: 17/566,229

(22) Filed: Dec. 30, 2021

(65) Prior Publication Data
US 2022/0279730 A1 Sep. 8, 2022

Related U.S. Application Data

(60) Provisional application No. 63/133,120, filed on Dec. 31, 2020.

(51) Int. Cl.
*A01G 9/24* (2006.01)
*A01G 9/22* (2006.01)
*F24S 60/30* (2018.01)

(52) U.S. Cl.
CPC .............. *A01G 9/24* (2013.01); *A01G 9/22* (2013.01); *F24S 60/30* (2018.05)

(58) Field of Classification Search
CPC . A01G 9/24; A01G 9/245; F24S 10/50; F24S 2020/13; F24S 2020/18; F24S 23/10; F24S 23/74
See application file for complete search history.

(56) References Cited

U.S. PATENT DOCUMENTS

| | | | | |
|---|---|---|---|---|
| 4,141,338 A | * | 2/1979 | Lof | F24S 10/55 165/170 |
| 4,307,710 A | * | 12/1981 | Natter | F24S 25/00 126/700 |
| 4,314,397 A | * | 2/1982 | Goolsby | F28F 1/02 228/111.5 |
| 5,237,827 A | * | 8/1993 | Tchernev | F03G 6/00 62/480 |
| 5,360,057 A | * | 11/1994 | Rockenfeller | F25B 29/006 62/480 |
| 9,404,673 B2 | * | 8/2016 | Swift | F24S 20/67 |
| 2005/0241815 A1 | * | 11/2005 | Caze | F28F 3/12 165/170 |
| 2013/0333444 A1 | * | 12/2013 | Kanai | G01N 30/90 165/170 |
| 2014/0166075 A1 | * | 6/2014 | Koppikar | H02S 40/425 136/246 |
| 2014/0204450 A1 | * | 7/2014 | Progler | G01N 27/44782 137/833 |

(Continued)

*Primary Examiner* — Ko-Wei Lin
(74) *Attorney, Agent, or Firm* — SQUIRE PATTON BOGGS (US) LLP

(57) ABSTRACT

Facades, roofs, and greenhouses that may capable of self-cooling are provided. For example, a façade for a greenhouse may include an internal glass wall and an external glass wall in a parallel plane to the internal glass wall and separated from the internal glass wall by a first distance. The distance may be configured to permit passage of a heat transfer liquid. The internal glass wall can include a first face, facing the external glass wall. The first face of the internal glass wall can include a reflective surface configured to reflect solar radiation into the heat transfer liquid when in operation.

16 Claims, 6 Drawing Sheets

(56) References Cited

U.S. PATENT DOCUMENTS

| | | | |
|---|---|---|---|
| 2014/0373829 A1* | 12/2014 | Leighton | F24S 20/67 126/634 |
| 2021/0018184 A1* | 1/2021 | Hokanson | F24S 20/67 |
| 2021/0381724 A1* | 12/2021 | Miller | F24S 80/40 |

* cited by examiner

A: Reactor A
B: Reactor B
C: Condenser
E: Evaporator
Ex: Heat Exchanger
G: Greenhouse $T_{ev}$: Evaporation temperature $T_{cond}$: Condensation temperature $T_{ads}$: Minimal adsorption temperature $T_{sd}$: Minimal Desorption temperature $T_{des}$: Maximal desorption temperature $T_{sa}$: Maximal adsorption temperature

SELF-COOLING GREENHOUSE FOR HOT CLIMATE

CROSS-REFERENCE TO RELATED APPLICATION

This application is related and claims the benefit and priority of U.S. Provisional Patent Application No. 63/133,120, filed Dec. 31, 2020, the entirety of which is hereby incorporated herein by reference.

FIELD

Some example embodiments may generally relate to greenhouse systems, devices, and methods. For example, certain greenhouses for hot climates may benefit from a self-cooling arrangement that may provide an efficient and environmentally conscious approach to thermal control of a greenhouse environment.

BACKGROUND

Agriculture has been in development since the most ancient times of recorded history. The industrial revolution brought enormous advances in multiple areas of technology, including improvements relates to the use of the internal combustion engine and other modern technology in agriculture.

Nevertheless, although the industrial revolution dramatically changed traditional agriculture, many traditional agricultural activities continue face challenges connected to scarcity of resources, harsh climate, increasing food demand, and risk of interrupted food supplies.

Precision and sustainable agriculture offers an alternative to traditional agriculture activities. Precision and sustainable agriculture has opened new challenges and perspectives regarding the development of efficient approaches, where objectives include water savings and energy efficiency.

SUMMARY

An embodiment may be directed to a façade for a greenhouse. The façade may include an internal glass wall and an external glass wall in a parallel plane to the internal glass wall and separated from the internal glass wall by a first distance. The distance may be configured to permit passage of a heat transfer liquid. The internal glass wall can include a first face, facing the external glass wall. The first face of the internal glass wall can include a reflective surface configured to reflect solar radiation into the heat transfer liquid when in operation.

An embodiment may be directed to a roof for a greenhouse. The roof can include a pair of facades connected to one another along a first edge of each façade of the pair. Each façade can include an internal glass wall and an external glass wall in a parallel plane to the internal glass wall and separated from the internal glass wall by a first distance. The distance can be configured to permit passage of a heat transfer liquid. The roof can also include a reflector along the first edge, wherein the facades of the pair are connected to one another via the reflector.

An embodiment may be directed to a greenhouse that includes a roof configured to adsorb thermal energy from the Sun to an interior of the greenhouse using a heat transfer liquid. The greenhouse may also include a heat exchange system configured to receive the heat transfer liquid and to recover the thermal energy from the heat transfer liquid.

BRIEF DESCRIPTION OF THE DRAWINGS

For proper understanding of example embodiments, reference should be made to the accompanying drawings, wherein.

DETAILED DESCRIPTION

Figure 1:
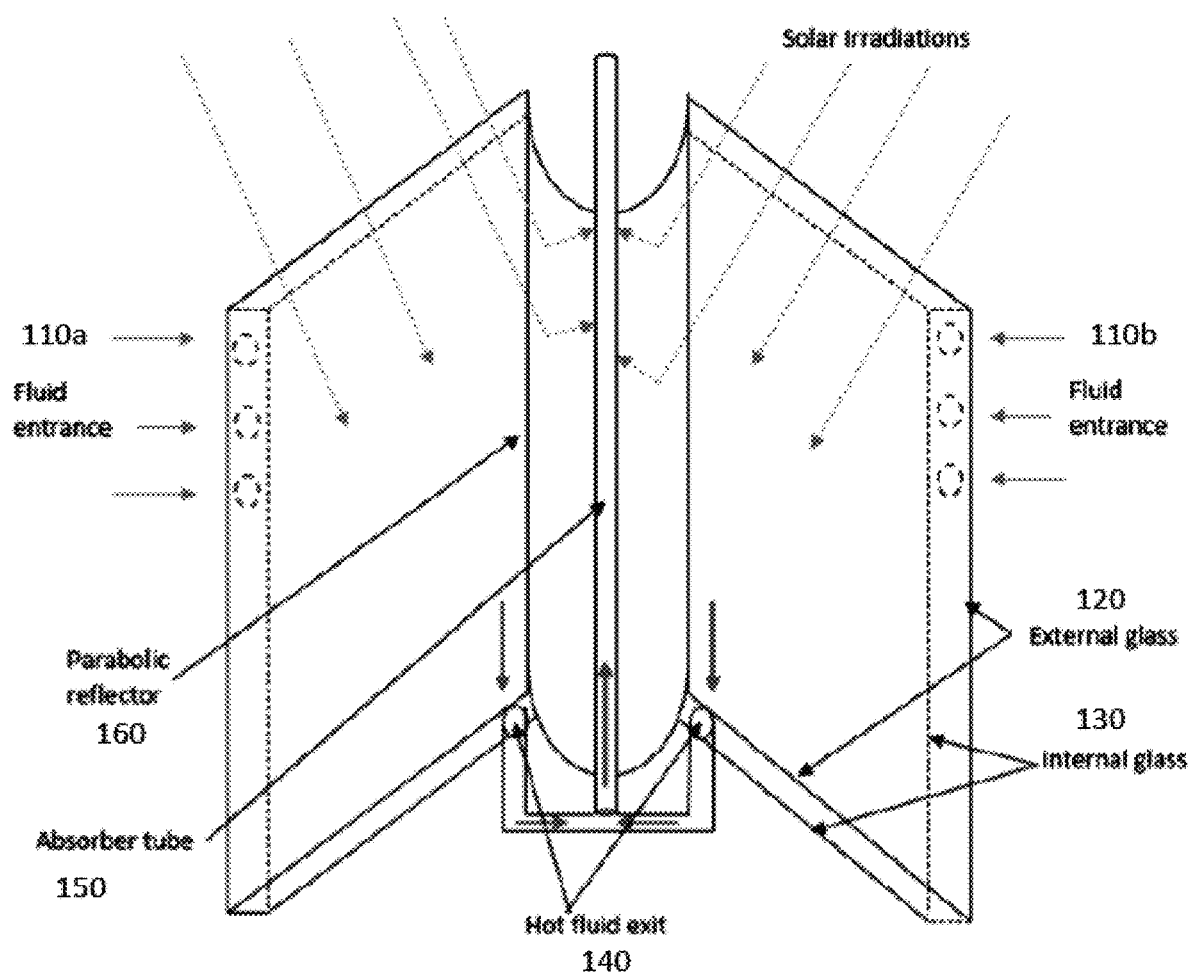
FIG. 1 illustrates a design of a greenhouse's roof, according to certain embodiments.

It will be readily understood that the components of certain example embodiments, as generally described and illustrated in the figures herein, may be arranged and designed in a wide variety of different configurations. Thus, the following detailed description of some example embodiments of self-cooling arrangements that may provide an efficient and environmentally conscious approach to thermal control of a greenhouse environment, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments described herein relate to a sustainable greenhouse, which provide a solution to cope with challenges of agriculture development. A sustainable greenhouse may aid in the transition to precision and sustainable agricultural by providing efficient solutions, methods as well as functional designs. Such solutions, methods, and functional designs may improve the sustainable water/energy supply and support agriculture to meet the growing number of regulations on environment and quality, while minimizing adverse effect with respect to climate change. A greenhouse may be considered a sustainable greenhouse because it may contribute to sustainable agriculture performed within the greenhouse.

Certain embodiments described herein may provide an innovative sustainable design for a self-cooling greenhouse that may be suited to hot climates as well as to hot weather situations in moderate climates. The design of certain embodiments may be suitable to industrial-sized greenhouses. Industrial-sized greenhouses to which such embodiments may apply, may include underground or ground level. Above-ground greenhouses may similarly benefit from certain embodiments.

Installing an underground greenhouse in a hot climate may offer insulation from the outside climate and consequently extra cooler conditions to the internal microclimate for crop development. The internal microclimate can refer to the climate within the greenhouse where plants or other crops are being grown, as distinct from the external climate. The greenhouse can serve to maintain a distinction between the external climate and internal microclimate, as well as to control and maintain the internal microclimate, even despite the conditions of the external climate.

A self-cooling greenhouse may improve the sustainable water/energy supply and may support the agriculture to meet the growing number of regulations on environment, quality and as well as minimizing the effects of climate change. Certain embodiments may provide a solution facing the agriculture challenges in hot climate by providing an advanced design that may be capable of ensuring a sustainable environment for the development of crops and for energy savings. Next generation agriculture may benefit from the design of certain embodiments. Moreover, certain embodiments may help to maintain independence of national food supplies, which may promote the security thereof. In addition, certain embodiments may serve as the next-generation agriculture systems.

Certain embodiments may be used to enhance food production in hot climates, to promote integration and use of clean and sustainable renewable energy, and to transition into sustainable agriculture. Certain embodiments may be of importance for viable design and development of next-generation agriculture systems integrating renewable energy sources and various technologies. Moreover, the developed design may improve transition to sustainable agriculture in terms of self-cooling, energy and water saving, and enhancement to crops production. Furthermore, certain embodiments may provide a practical and efficient solution to resolve the challenging issues related to hot climate.

Certain embodiments may be useful to farmers, food industries, decision makers, engineers, technicians and renewable energy companies. Certain embodiments may be implemented in or as industrial-sized greenhouses, for example any large greenhouses, to ensure high performance of the cooling system, since the adsorption/desorption cooling process may be driven by a high temperature heat transfer fluid. Certain embodiments may be adapted to small size greenhouses as well. In certain embodiments, the roof may be used to protect the internal environment from high heat and may consequently stabilize the internal temperature.

Certain embodiments may provide a self-cooling greenhouse, for example industrial-sized underground or ground level greenhouses, that may be suited to hot climate through a high temperature adsorption/desorption cooling process. For example, certain embodiments may provide a new technological design for a self-cooling greenhouse to face hot climate challenges. The roof of the greenhouse according to some embodiments may be a heat exchanger coupled with a solar concentrating collector to extract the thermal energy as well as to protect the internal microclimate. An adsorption/desorption process may be adopted, which may rely on principles of heat transfer using heat transfer fluid to cool the greenhouse using fans and heat exchangers.

Certain embodiments may provide a technological design for a self-cooling greenhouse to face hot climate challenges. The roof of the greenhouse may be a heat exchanger coupled with a solar concentrating collector to extract the thermal energy, as well as to protect the internal microclimate. The design may include two identical or similar facades. Each façade may have two layers of glass, as well as a parabolic reflector integrating an absorber tube.

An internal surface of the system can include a front reflecting layer, which may have a set of pyramidal shapes, that may reflect transmitted radiation to dissipate any remaining energy of the transmitted radiation in a heat transfer fluid, instead of heating the internal environment. This process may be viewed as recovering the thermal energy to the heat transfer fluid and may avoid heating the greenhouse.

An adsorption/desorption process using zeolite as adsorbent and water as an adsorbate may be used.

Certain embodiments may provide a technological design for a self-cooling greenhouse to face hot climate challenges. FIG. 1 illustrates a roof of a greenhouse of certain embodiments. As illustrated in FIG. 1, the roof may contain or itself serve as a heat exchanger coupled with a solar concentrating collector. The view of FIG. 1 is not to scale, and is bottom view. The roof of FIG. 1 is shown with a gable roof, although the same principles may also apply to other roof shapes, such as a hip roof, Dutch roof, Mansard roof, shed roof, Gambrel roof, or butterfly roof. Other roof shapes are also permitted, with these roof shapes serving as illustrative examples.

As shown in FIG. 1, fluid may enter both fluid entrances 110a, 110b. The source of the fluid is not shown in this figure. The fluid may run between external glass 120 and internal glass 130. The external glass 120 may be so called because it may be the surface of the glass closer to the sun. It is not necessary that the external glass be the outermost layer of the roof. FIG. 1 does not show any of the supporting structures that are used to provide structural integrity to the glass, such as frames or the like. Any architecturally suitable materials may be used to support the glass. A pressure source, which may be gravity or a pump system, may ensure that a constant pressure of the fluid is present between external glass 120 and internal glass 130.

After passing between external glass 120 and internal glass 130, the fluid may be heated by the sun and may exit through hit fluid exit 140. Hot fluid exit 140 may be located near a top of the roof, while fluid entrances 110a, 110b may be located near a bottom of the roof. A fluid may be used that at least slightly expands when heated, such that a natural flow toward the hot fluid exit 140 may be induced by heating.

The hot fluid may then proceed into absorber tube 150, which may pass through a focus of parabolic reflector 160 at a ridge of the roof. A parabolic reflector is provided as one example of a reflector shape, but other reflector shapes are also permitted. A pipe is shown to transfer the hot fluid between the hot fluid exit 140 and the absorber tube 150. The absorber tube 150 may be so called because heat is absorbed by the fluid within the tube in use. No exit from the absorber tube 150 is shown, but the hot fluid may ultimately exit the adsorber tube 150. In a closed system, after cooling in a heat exchanger (not shown), the fluid may return to fluid entrances 110a, 110b.

Figure 2:
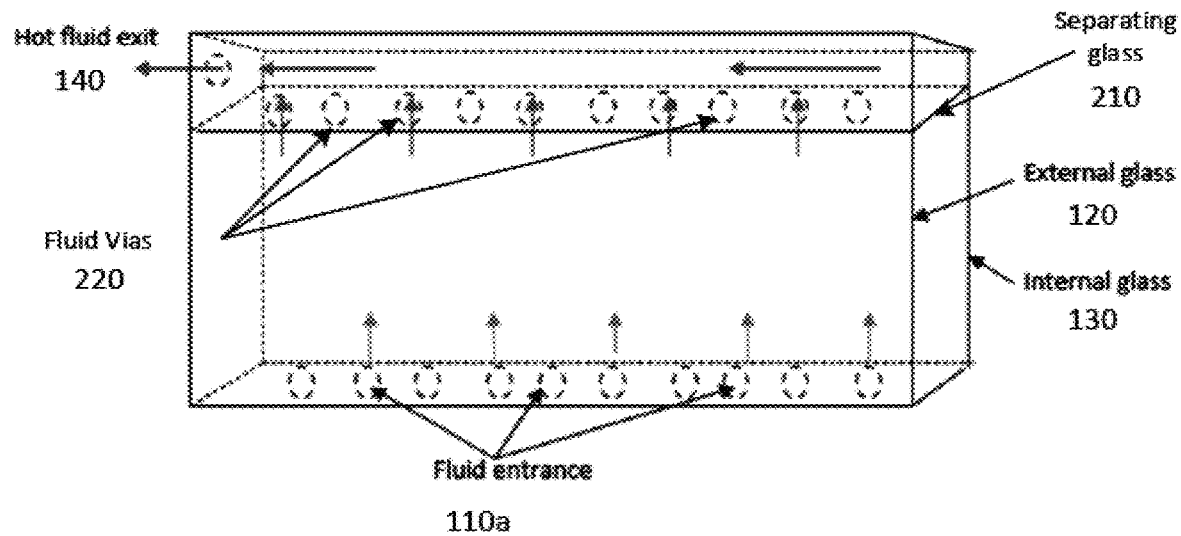
FIG. 2 illustrates a design of a façade, according to certain embodiments.

The roof of FIG. 1 is shown with two façades, one on the left, and one on the right. FIG. 2 illustrates a façade according to certain embodiments. As shown in FIG. 2, the façade may include fluid entrances 110a and a hot fluid exit 140. The façade may have an external glass 120 and an internal glass 130. There also be other features of the façade, such as a separating glass 210 with fluid vias 220. The separating glass 210 and fluid vias 220 may facilitate proper fluid flow of the fluid.

Certain embodiments of the present design may include multiple similar facades, each one may include two or more layers of glass, as well as a parabolic reflector integrating an absorber tube.

Figure 3:
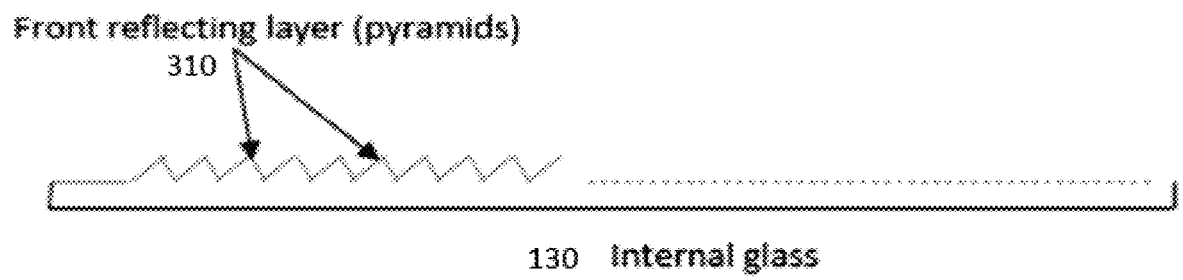
FIG. 3 illustrates a design of internal glass of the system, according to certain embodiments.

FIG. 3 illustrates a design of internal glass of the system, according to certain embodiments. The internal glass 130 may be configured to reflect incident light or other solar radiation back away from an inside of the greenhouse. The side of the internal glass 130 toward the sun may have a front reflecting layer 310. In this example, the front reflecting layer 310 is illustrated a set of pyramids. Other reflective surfaces are also permitted, such as cones. The material of internal glass 130 may be selected to maximize total internal reflection of light. The front reflecting layer 310 may project into a the fluid, not shown in this drawing.

The heat transfer fluid may be used to absorb the thermal energy of the transmitted and absorbed solar radiation. The transmitted radiation may be losing part of this energy passing through the heat transfer fluid. The latter may be reflected again when arriving the front reflecting layer (pyramids) of internal cover illustrated in FIG. 3 to dissipate any remaining thermal energy in the heat transfer fluid instead of heating the internal environment. This process may recover the thermal energy and may avoid heating the greenhouse.

The cold heat transfer fluid may enter from the bottom of both facades. The sunlight passing through the transparent covers of the roof may heat up the heat transfer fluid and may consequently avoid heating up the internal environment of the greenhouse. The high temperature heat transfer fluid may be directed in both facades to an exit through pipes. The fluid may then enter to the absorber tube of the solar concentrator to heat up further, reaching a high temperature.

The plants in the greenhouse may need sunlight for their development. The three relevant bands along the solar radiation spectrum can be ultraviolet, visible, and infrared. Visible light constitutes about 45 percent of the entire solar spectrum. Plants may utilize only nearly half of the sunlight's energy, or even less. In general plants absorb just a portion of the light. For example, photosynthesis makes use of the visible light band, wavelengths ranged from 400 nm to 700 nm, of the electromagnetic spectrum. Some of the wavelengths and colors are useful for plants while other ones suppress photosynthesis. As an example, far-red and green light may not be absorbed and consequently may be reflected.

Certain embodiments may use colored heat transfer fluid to avoid undesired bands and wavelengths, which may allow minimizing or reducing of the temperature increase inside the greenhouse, and may facilitate the cooling process. Pigments incorporated into the heat transfer fluid may be used to selectively tune the desired color of the heat transfer fluid.

Figure 4:
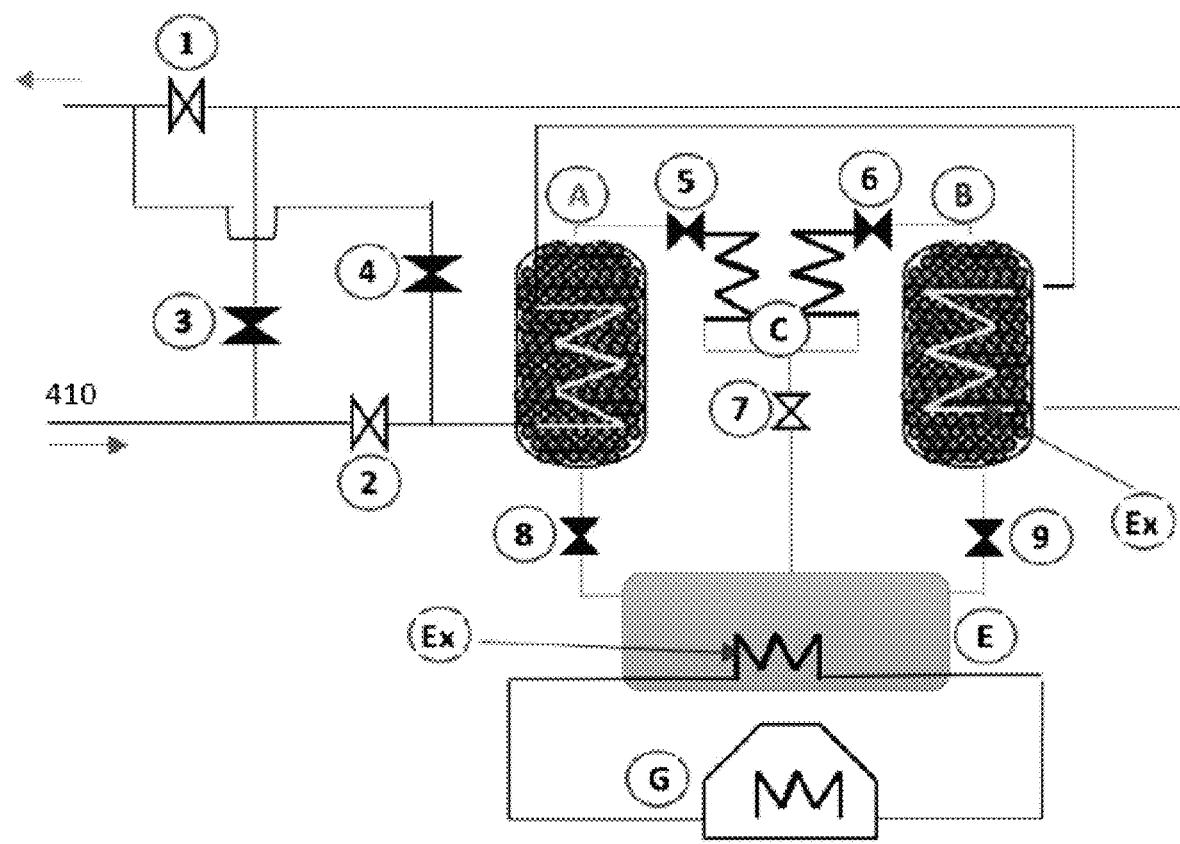
FIG. 4 illustrates a first reactor in heating and increasing pressure phase and a second reactor in cooling and the pressure reduction phase, according to certain embodiments.

As mentioned above, the fluid may also be provided to a heat exchanger system. The system may include a first reactor, reactor A, and a second reactor, reactor B, as well as a heat exchanger, Ex, connected to the greenhouse, G. FIG. 4 illustrates reactor A in heating and increasing pressure phase (a-b in FIG. 5) and reactor B in cooling and the pressure reduction phase (c-d in FIG. 5), according to certain embodiments.

The high temperature heat transfer fluid may enter the system via a collector tube 410 from the greenhouse and may be directed to a chiller unit where it may enter, via valve 2, the reactor A as illustrated in FIG. 4. Reactor A may be in the desorption phase represented by the line "a-b" in the thermodynamic cycle presented in FIG. 5. Reactor A may let the adsorbent within the reactor, in this example zeolite, desorbs an amount (for example, the maximum) of water vapor. The heat transfer fluid leaving the reactor A toward reactor B may be cooled by transmitting most of the thermal energy to this reactor. The cooled fluid may enter the reactor B to cool it allowing the reactor to adsorb a maximum of adsorbate (water vapor) coming from the evaporator (line "c-d" in FIG. 5) via valve 9.

Figure 5:
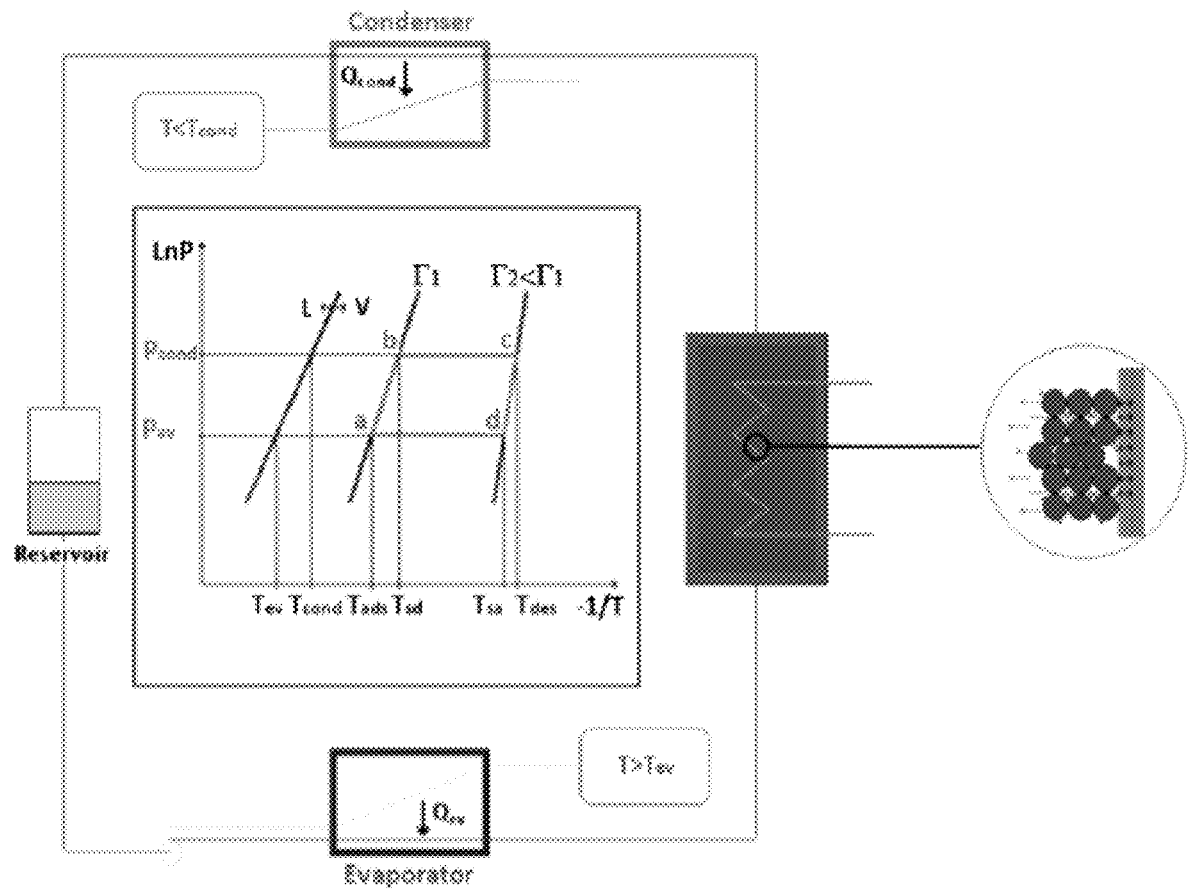
FIG. 5 illustrates a thermodynamic cycle of an adsorption cooling system, according to certain embodiments.

FIG. 5 illustrates a thermodynamic cycle of an adsorption cooling system, according to certain embodiments. As shown in FIG. 5, fluid in the system can cycle from a reservoir, through an evaporator, through a reactor, through a condenser, and can return to the reservoir. In FIG. 5, Γ1 and Γ2 represent the adsorbed water content in a corresponding reactor. The system can run through the thermodynamic cycle of the cooling system as illustrated, through the control of the various valves of the system.

Figure 6:
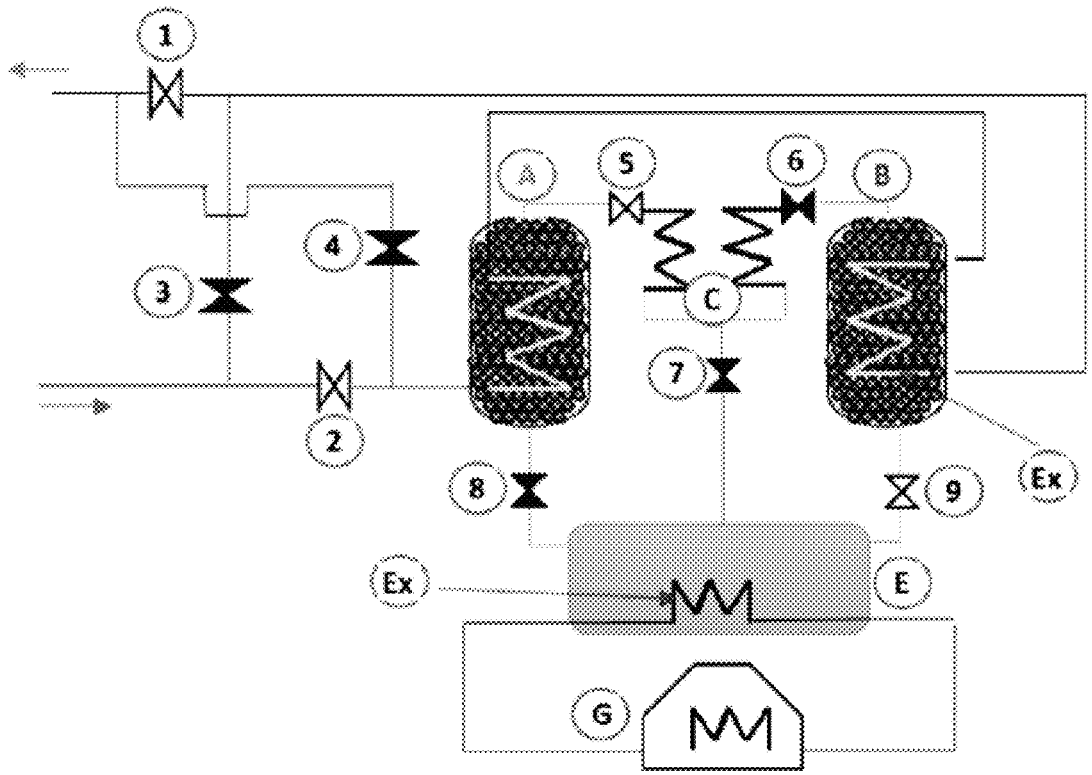
FIG. 6 illustrates a first reactor in desorption phase and a second reactor in adsorption phase, according to certain embodiments.

FIG. 6 illustrates reactor A in desorption phase (b-c) and reactor B in adsorption phase (d-a), according to certain embodiments. When the pressure in the reactor A reaches the condenser pressure (Pcond in FIG. 5) and the pressure in the reactor B drops down to the evaporator pressure (Pev in FIG. 5), the valves 5 and 9 may open as shown in FIG. 6. Valve 5 may allow the vapor leaving the reactor A to enter the condenser to condense in it by transmitting the heat $Q_{cond}$ to the condenser (line "b-c" in FIG. 5) and the valve V9 may let the reactor B adsorb vapor from the evaporator as shown is FIG. 6, by absorbing the heat $Q_{ev}$ from the evaporator (line "d-a" in FIG. 5). The latent heat of the evaporation may be supplied by equivalent reduction of the sensible heat of the evaporating water, which may result in a gradual lowering of temperature. The warmed up heat transfer fluid leaving the reactor B may then be pumped via valve 1 to the greenhouse (through the fluid entrance) to be heated again.

Figure 7:
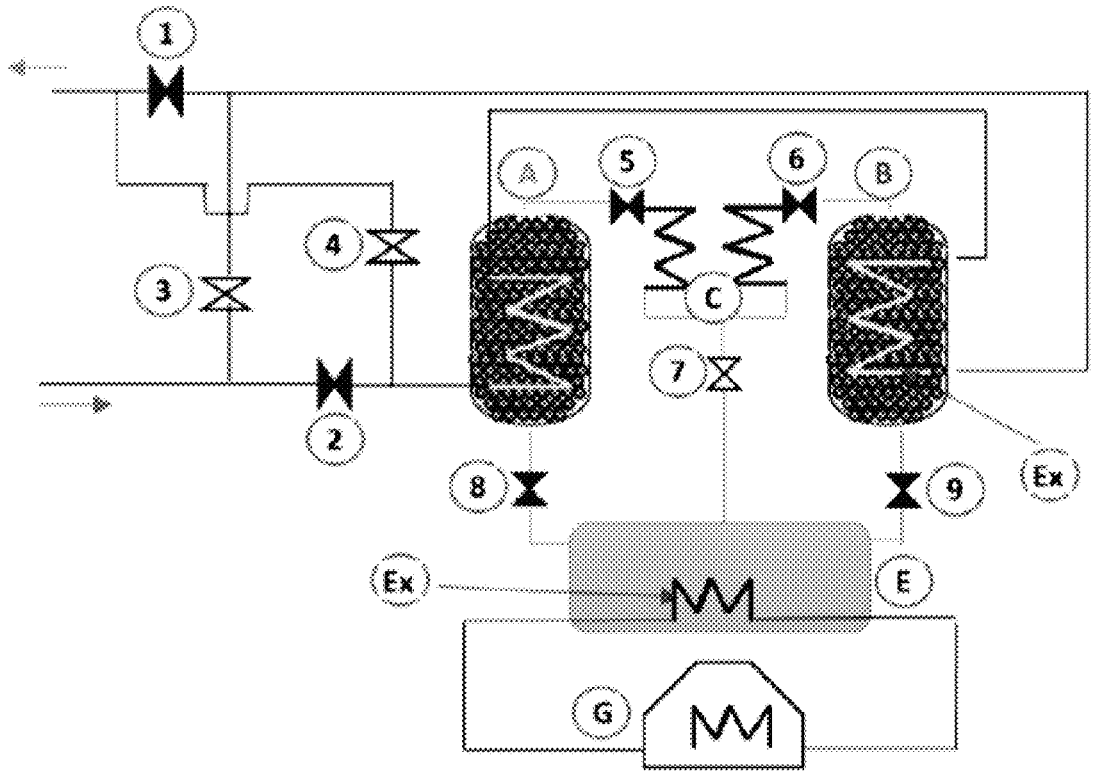
FIG. 7 illustrates a first reactor in cooling and pressure reduction phase and a second reactor in heating and increasing pressure phase, according to certain embodiments.

When the total reactor A is desorbed as much as possible and the total reactor B is saturated with vapor, the valves 5 and 9 may close and the condensed water may be transferred to the evaporator via the valve 7 as shown in FIG. 7. FIG. 7 illustrates reactor A in cooling and pressure reduction phase (c-d) and reactor B in heating and increasing pressure phase (a-b), according to certain embodiments.

Another cycle may start where the reactor A may enter the adsorption phase and the reactor B in the desorption phase. The high temperature heat transfer fluid coming from the greenhouse may enter via the valve 3 the reactor B to heat up and to desorb it as shown in FIG. 7. The heat transfer fluid leaving the reactor B may then be routed to the reactor A to cool it. In this way, the fluid flow can be symmetrically opposite to the fluid flow in FIG. 4, described above, with reactors A and B having opposite and alternating roles.

Figure 8:
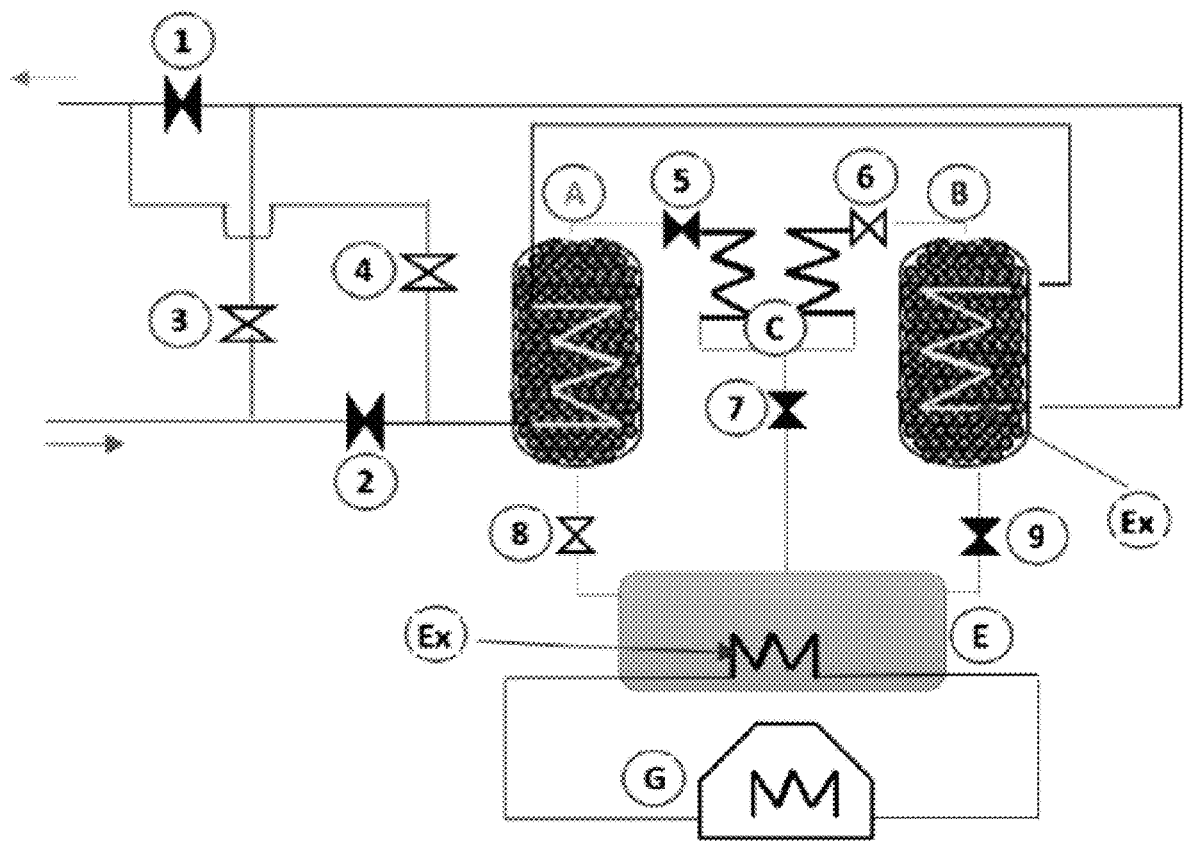
FIG. 8 illustrates a first reactor in adsorption phase and a second reactor in desorption phase, according to certain embodiments.

When the pressure in the reactor B reaches the condenser pressure (Pcond in FIG. 5) and the pressure in the reactor A drops down to the evaporator pressure (Pev in FIG. 5), the valve 7 may close and the valves 6 and 8 may open as shown in FIG. 8. Valve 6 may allow the vapor to enter the condenser and to condense in the condenser and the valve 8 may let the reactor B adsorb vapor from the evaporator to continue to produce cold in it. The heat transfer fluid coming out the reactor B may be cooled by heating this reactor. It may enter the reactor A to cool it to allow the bed of the reactor (made, for example, of zeolite) to adsorb a maximum of vapor coming from the evaporator. Via valve 4, the warmed up heat transfer fluid leaving the reactor A may then be pumped to the greenhouse to be more heated. This may be seen as a symmetrically opposite fluid path to that shown in FIG. 6 and described above.

Figure 9:
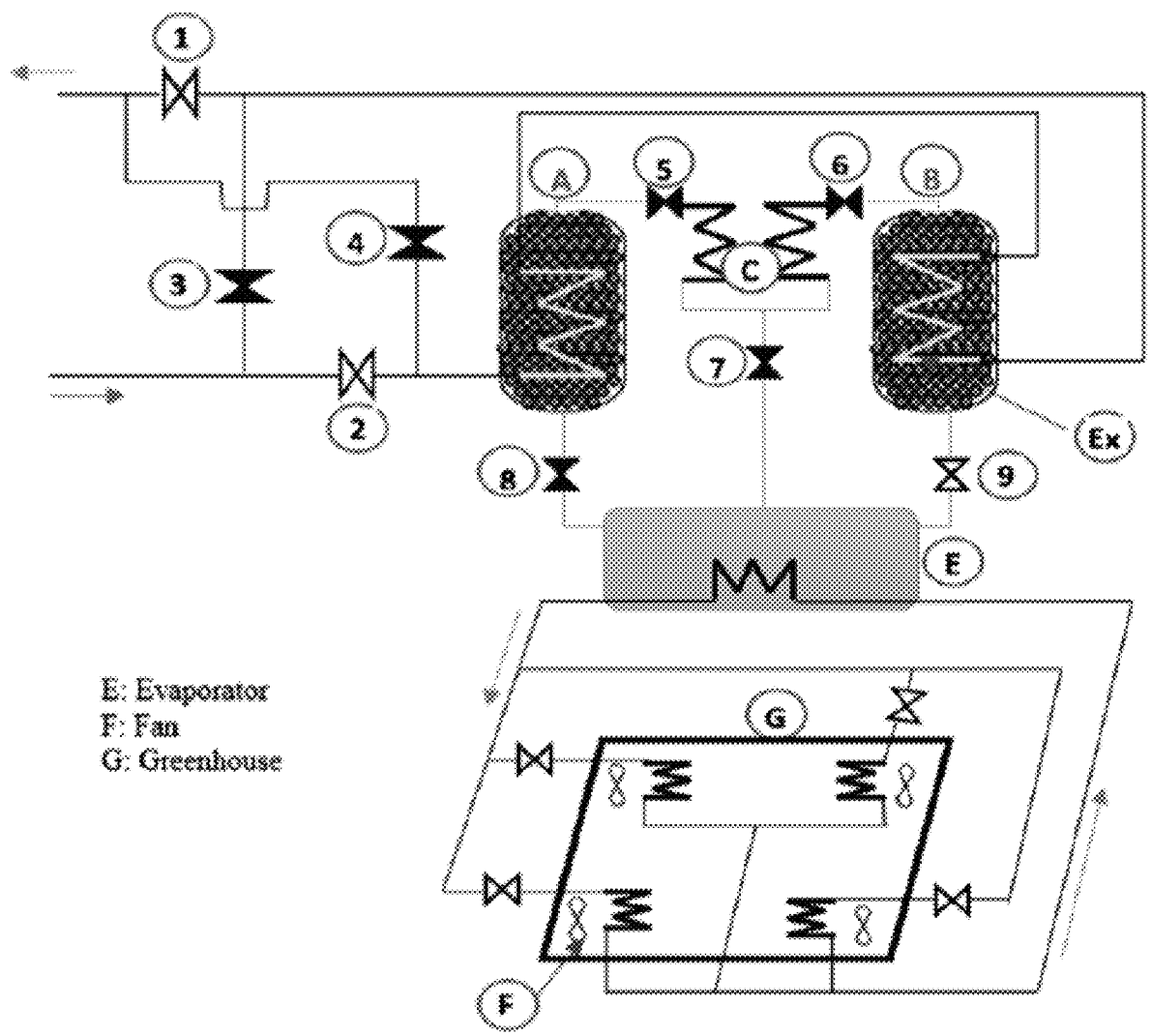
FIG. 9 illustrates an architecture of a self-cooling greenhouse, according to certain embodiments.

FIG. 9 illustrates an architecture of a self-cooling greenhouse, according to certain embodiments. As described above, the cold may be produced in the evaporator alternately by the two reactors when they are separately in the adsorption phase. A heat exchanger (Ex) may be placed in the evaporator (E) to cool the water coming from the air/water heat exchangers introduced in the greenhouse and may be used to refresh the air inside the greenhouse. For example, fans (F) may be used to homogenize the temperature inside the greenhouse, and may thereby improve performance of the cooling.

According to one aspect, certain embodiments may relate to a façade for a greenhouse. The façade may include an internal glass wall and an external glass wall in a parallel plane to the internal glass wall and separated from the internal glass wall by a first distance. The distance may be configured to permit passage of a heat transfer liquid. The internal glass wall can include a first face, facing the external glass wall. The first face of the internal glass wall can include a reflective surface configured to reflect solar radiation into the heat transfer liquid when in operation.

The reflective surface can be a textured surface having a texture. The texture can be pyramids, as discussed above, although other textures such as cones are also permitted.

According to another aspect, certain embodiments may relate to a roof for a greenhouse. The roof may include a pair of facades connected to one another along a first edge of each façade of the pair. The facades may each be constructed as described above. The roof may also include a reflector along the first edge. The facades of the pair can be connected to one another via the reflector.

The roof can further include an adsorber tube configured to convey the heat transfer liquid from the pair of facades along a focus of the reflector. The reflector can be a parabolic reflector. In another option, the reflector may be a semicylindrical reflector, and the adsorber may extend through a central area of the semicylindrical reflector. Other reflector shapes, including shapes with planar sides, are also permitted.

According to a further aspect, certain embodiments may relate to a greenhouse. The greenhouse can include a roof configured to adsorb thermal energy from the Sun to an interior of the greenhouse using a heat transfer liquid. The greenhouse can also include a heat exchange system configured to receive the heat transfer liquid and to recover the thermal energy from the heat transfer liquid.

The roof and the facades thereof can be configured as described above.

The heat transfer liquid can be configured to reflect or absorb at least one undesired band or wavelength of visible light based on a color of the heat transfer liquid. For example, a dye or other pigment may be added to water to permit the water to preferentially absorbs or reflect an undesired wavelength or band of solar radiation, such as a portion of the visible light spectrum.

The heat exchange system can include a pair of reactors that include a first reactor and a second reactor (for example reactor A and reactor B in the figures discussed above). The reactors can include an adsorbent configured to adsorb the heat transfer liquid as adsorbate. The adsorbent ca be zeolite.

The pair of reactors can be configured to operate alternatingly, with a first reactor in a heating and increasing pressure phase while a second reactor is in a cooling and pressure reduction phase, and then the first reactor in the cooling and pressure reduction phase while the second reactor is in the heating and increasing pressure phase.

The heat exchange system can include a reservoir of the heat transfer liquid, an evaporator, the pair of reactors, and a compressor in fluid communication with one another via a plurality of valves. Examples of such arrangements are shown in FIGS. 4-9, above.

A heat exchanger in the evaporator can be configured to cool liquid that circulates through the interior of the greenhouse to control an interior temperature of the greenhouse. A controller, not shown in FIG. 9, may control the circulation of the cool liquid as well as the speed or on/off status of various fans throughout the greenhouse.

Various embodiments may rely on software, for example for control of heating or cooling the greenhouse. In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components that, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single greenhouse, roof, or façade may also apply to example embodiments that include multiple greenhouses, roofs, or facades, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A roof for a greenhouse, comprising:
a pair of facades connected to one another along a first edge of each façade of the pair, wherein each façade comprises an internal glass wall and an external glass wall in a parallel plane to the internal glass wall and separated from the internal glass wall by a first distance, wherein the distance is configured to permit passage of a heat transfer liquid;
a reflector along the first edge, wherein the pair of facades are connected to one another via the reflector.

2. The roof of claim 1, further comprising:
an adsorber tube configured to convey the heat transfer liquid from the pair of facades along a focus of the reflector, wherein the reflector comprises a parabolic reflector.

3. The roof of claim 1, wherein the internal glass wall comprises a first face, facing the external glass wall, and wherein the first face of the internal glass wall comprises a reflective surface configured to reflect solar radiation into the heat transfer liquid when in operation.

4. The roof of claim 3, wherein the reflective surface comprises a textured surface having a texture.

5. The roof of claim 4, wherein the texture comprises pyramids.

6. A greenhouse, comprising:
a roof configured to adsorb thermal energy from the Sun to an interior of the greenhouse using a heat transfer liquid; and
a heat exchange system configured to receive the heat transfer liquid and to recover the thermal energy from the heat transfer liquid,
wherein the roof comprises
a pair of facades connected to one another along a first edge of each façade of the pair; and
a reflector along the first edge, wherein the pair of facades are connected to one another via the reflector.

7. A greenhouse, comprising:
a roof configured to adsorb thermal energy from the Sun to an interior of the greenhouse using a heat transfer liquid; and
a heat exchange system configured to receive the heat transfer liquid and to recover the thermal energy from the heat transfer liquid,
wherein the roof comprises
a pair of facades connected to one another along a first edge of each façade of the pair; and
a reflector along the first edge, wherein the pair of facades are connected to one another via the reflector, and
wherein each façade comprises an internal glass wall and an external glass wall in a parallel plane to the internal glass wall and separated from the internal glass wall by a first distance, wherein the distance is configured to permit passage of the heat transfer liquid.

8. The greenhouse of claim 7, further comprising:
an adsorber tube configured to convey the heat transfer liquid from the pair of facades along a focus of the reflector, wherein the reflector comprises a parabolic reflector.

9. The greenhouse of claim 7, wherein the internal glass wall comprises a first face, facing the external glass wall, and wherein the first face of the internal glass wall comprises a reflective surface configured to reflect solar radiation into the heat transfer liquid when in operation.

10. The greenhouse of claim 9, wherein the reflective surface comprises a textured surface having a texture.

11. The greenhouse of claim 10, wherein the texture comprises pyramids.

12. The greenhouse of claim 6, wherein the heat transfer liquid is configured to reflect or absorb at least one undesired band or wavelength of visible light based on a color of the heat transfer liquid.

13. A greenhouse, comprising:
a roof configured to adsorb thermal energy from the Sun to an interior of the greenhouse using a heat transfer liquid; and
a heat exchange system configured to receive the heat transfer liquid and to recover the thermal energy from the heat transfer liquid,
wherein the heat exchange system comprises a pair of reactors comprising a first reactor and a second reactor, wherein the reactors comprise an adsorbent configured to adsorb the heat transfer liquid as adsorbate.

14. The greenhouse of claim 13, wherein the pair of reactors are configured to operate alternatingly, with a first reactor in a heating and increasing pressure phase while a second reactor is in a cooling and pressure reduction phase, and then the first reactor in the cooling and pressure reduction phase while the second reactor is in the heating and increasing pressure phase.

15. The greenhouse of claim 13, wherein the heat exchange system comprises a reservoir of the heat transfer liquid, an evaporator, the pair of reactors, and a compressor in fluid communication with one another via a plurality of valves.

16. The greenhouse of claim 15, wherein a heat exchanger in the evaporator is configured to cool liquid that circulates through the interior of the greenhouse to control an interior temperature of the greenhouse.

* * * * *